Patented Nov. 26, 1929

1,737,365

UNITED STATES PATENT OFFICE

ALBERT K. EPSTEIN, OF CHICAGO, ILLINOIS

EGG PRODUCT AND PROCESS FOR PRODUCING THE SAME

No Drawing. Application filed October 13, 1928. Serial No. 312,395.

My invention relates to egg products and process for producing the same, being directed more particularly to a process of improving the colloidal properties of egg material such as yolk, yolk and whites in the form of mixed eggs, and egg yolk containing varying amounts of egg whites or whole mixed eggs with varying amounts of egg white, and an improved product resulting from said process.

My process can also be applied to egg materials, which have been modified with other substances such as soluble carbohydrates, inorganic salts like sodium chloride, and substances which increase the hydrogen-ion concentration of the egg material, and egg material containing various suitable combinations of these substances.

When egg material is used as a means of emulsification of oils and fats, the function of the egg material depends upon the colloidal properties of the egg substance or upon the dispersion of the various constituents of the eggs such as the dispersion of the various nitrogenous protein materials found in the white and in the yolk; also, upon the dispersion of the various lipoids found in the yolk and also upon the condition in which the moisture exists in the egg substance. Similarly, when egg material is used in the baking of cakes, its function as a shortening or lubricant in the cake mixture depends upon the colloidal condition of the egg constituents.

When egg material is taken out of the shell, it contains on the average of 72 to 73% of total moisture. The white of the egg contains approximately from 87 to 88% of moisture. The actual yolk material usually contains about 51% of moisture but when separated from the white under commercial conditions, the amount of moisture in the yolk material varies, depending upon the amount of care exercised in separation. If more whites are allowed to remain adhering to the yolk, the resultant yolk product contains a relatively larger percentage of moisture.

In certain food industries, it is desirable to use the commercially separated yolk. In other food industries, it is desirable to use the mixed eggs as they are obtained from the shell. In other industries, such as in some ice cream formulæ, many manufacturers have found it preferable to add a certain amount of whites to the mixed whole egg.

Substances such as sodium chloride, water soluble organic substances containing hydroxyl groups capable of preventing denaturing of proteins during freezing, such as glycerine, sucrose, dextrose and substances which are capable of liberating hydrogen-ion content with egg substances such as citric acid, lactic acid, tartaric acid and their equivalents, have a certain effect in modifying the physical consistency of egg material when used in sufficient quantity and the mixture thawed after being sufficiently frozen.

Each one of these substances, although crystalloids, has a varying effect on egg material under different conditions such as when thawed after being frozen and also have different effects varying in concentration and also has different effects when in combination with each other in various proportions.

Substances like acid react chemically with the egg material. Substances like sodium chloride are electrolytes and have an effect, by virtue of their electrical charge, upon the protein material and also act osmotically. Substances like glycerine and carbohydrates, by virtue of the fact that they are crystalloids, act osmotically on the complex mixture of egg substance. All these various effects become different when they are in combination and in various proportions and when the product is frozen and thawed.

My present invention points towards an entirely new class of substances, which are substantially not crystalloids and do not react chemically with the egg protein.

I have discovered that the colloidal properties of the egg material may be modified and improved upon by the addition of certain substances to the egg material, the added substances being organic hydrophyllic colloids such as imbibe water and change the entire physical consistency of the egg material and also its emulsifying and wetting properties.

I have discovered that a substance such as gum tragacanth, or equivalent hydrophyllic colloidal substance, if added to egg material becomes dispersed in the moisture present and becomes hydrated, thus changing the entire colloidal properties of the egg material and increasing its viscosity and the mode of its action when used in the various arts.

When the organic hydrophyllic colloid such as gum tragacanth is used in combination with crystalloids, in various proportions and varying concentrations in egg material, the effect in combination with the other properties becomes entirely different, thus, broadly speaking, my discovery relates to the modification of the colloidal, physical properties of egg material by using a substance of relatively smaller proportions, which does not react chemically upon the egg protein, nor does it react similarly to crystalloids in the egg substance, osmotically, but primarily its action is colloidal. Colloid substances such as gum tragacanth exerts substantially very little osmotic pressure when dissolved in water. The slight pressure exerted is due to traces of crystalloids present, but it is much less than the osmosis exerted by substances such as salt, or sugar. Its action with egg material is primarily colloidal in nature.

Another important difference is that all the substances enumerated above, namely: sodium chloride, sugar, glycerine and acid, when used in suitable large proportions, have a tendency to be bacteriological preservatives when used in sufficient amounts, besides exerting other effects, while the colloid substances, which are the subject of my discovery, have no such preservative properties by themselves.

Another important difference consists in the fact that the substances enumerated above have either a saline, a sweet or an acid taste, imparting to the egg material when used in substantial quantities, their respective tastes and flavors, while the colloidal substance which is the subject of this invention is substantially tasteless and does not impart to egg material any saline, sweet or acid taste.

The colloidal substances like gum tragacanth, for example, act on the egg material colloidally, physically and from a capillary standpoint, thus changing the entire colloidal equilibrium of the egg material, producing an entirely new effect and new properties.

When such egg material is subjected to freezing temperatures, another factor is introduced, which in combination with the colloidal and capillary effects of the gum, produces entirely new results.

When gum tragacanth is added to water, it has a tendency to swell and it takes some time before the product becomes properly hydrated. It usually forms lumps. If such a product is added to egg material, it would require a long period of time until each particle of the gum would become hydrated with the mixture of the egg material.

If the gum is added in a shredded form, its surface would become coated with the moisture and also coated with egg material; thus the surface of the particles of gum would imbibe moisture and at the same time prevent the moisture from entering the interior of the particles.

The same is true if powdered gum tragacanth is added. Small particles of gum would aggregate themselves into larger bodies and would become coated on the surface with egg material, thus preventing the moisture from hydrating each small particle of the gum. As a result of this, lumps would be formed and a lumpy product produced.

I have discovered that in order to obtain a uniform hydration of the gum particles, and a uniform dispersion in the egg material, it is advisable to substantially separate the particles of gum from each other, by intermixing with the finely powdered gum a substantially non-aqueous medium. This gives the hydrophyllic colloid an opportunity to become uniformly distributed throughout the non-aqueous medium, separating one particle of gum from another and thus preventing lumping and aggregating of the gum particles.

After the hydrophyllic colloid is distributed in the non-aqueous medium, it is added to the egg material. Each particle of gum finally becomes hydrated with the moisture in the egg material, changing the entire colloidal consistency of the product and producing a product which is smooth, uniform and without lumps and with improved colloidal properties.

The step of the process of introducing the hydrophyllic colloid into the egg material may also be carried out in a different manner. The colloidal material such as the powdered gum tragacanth is brought in intimate contact with a non-aqueous medium. This mixture is added to a suitable amount of water with agitation, allowing each particle of gum material to become hydrated, thus forming a uniform jelly-like mass without lumps and then this jelly-like mass is diluted with egg material in any desired proportion. It then becomes further dispersed in the moisture and other constituents of the egg material.

I have found in practice that the medium in which the hydrophyllic colloid is distributed with the object of separating one particle of colloid from another may be of two types; one type is an edible, non-aqueous substance in a liquid condition at ordinary temperatures, such as cotton seed oil, sesame oil, or other edible glycerides, liquid at ordinary temperatures and also other edible, suitable liquids of a non-aqueous type such as glycerine and its equivalents.

These non-aqueous liquids should be of such a type so that when the hydrophyllic colloid is suspended in it, it should not set to a firm jell, before the suspended colloid is added to the egg batch, but it should lubricate and coat the particles of hydrophyllic colloid.

The other type of substance in which the hydrophyllic colloid may be distributed is finely powdered water soluble solid materials such as sodium chloride, powdered crystalloid carbohydrates such as milk sugar, sucrose, dextrose or their equivalents.

If a powder such as sodium chloride is used, it is preferable to use it in a proportionately larger quantity than the gum. For example, one part of finely powdered gum tragacanth, intimately mixed with 8 to 10 parts of finely powdered sodium chloride is added to 91 parts of yolk material with agitation or slow stirring in order to allow the gum to become uniformly dispersed in the egg batch.

If, for example, pectin is used, it may be distributed in glycerine in suitable proportions and added to the batch of egg material directly, properly agitated, or a suitable amount of water may be added to the glycerine-pectin mixture to form a uniform jelly and a suitable quantity of this jelly-like mass added to this batch of egg with mixing or stirring to allow the glycerine-pectin mixture to become uniformly dispersed in the egg batch.

Another example is as follows: One part of gum tragacanth may be suspended in about 8 to 9 parts of glycerine and the mixture added to a batch of 90 parts of egg yolk and agitated in order to allow the gum to become uniformly hydrated and the glycerine dispersed in the egg material. In the case of the tragacanth-glycerine mixture, it is advisable to add the suspension of gum tragacanth in glycerine to the egg batch before the mixture will set to a firm jelly.

For the organic hydrophyllic colloid, I prefer to use a gum of the type of gum tragacanth or acacia or their equivalents such as citrous pectin or pectin from other sources, which are capable of imbibing water and becoming substantially, homogeneously dispersed in water by agitation at ordinary temperatures or facilitated by application of heat and agitation.

My process may be carried out in various manners. Illustrating one way in which the process is carried out in the case of mixed eggs, I give the following:—

The shell eggs are first inspected with reference to their wholesomeness by means of candling. Then, the shell of each individual egg is cracked. The contents are dropped into a cup and the wholesomeness of the product is observed with reference to odor as in the usual egg breaking procedure.

A large batch of egg material so prepared is then placed in any suitable mixing equipment. About 5 to 15 ounces of finely powdered gum tragacanth is mixed and distributed in a separate container with 2 to 5 pounds of vegetable oil such as cotton-seed oil, until the mixture becomes cloudy and the gum is uniformly distributed in the oil.

The gum and oil mixture is then added gradually to about 300 pounds of the eggs, mixing the batch while the gum and oil product is being added. The gum becomes uniformly dispersed throughout the entire mass and eventually becomes hydrated with the moisture of the egg material.

The resultant product is drawn off into cans and other receptacles and it may now be used directly in connection with some products if desired. If other properties are desired, and other colloidal changes are looked for, the mixture may be subjected to a process of freezing below a temperature of bacterial decomposition by placing the cans containing the product in a refrigerator at about 0° Fahrenheit or lower, and frozen. The product is kept in a frozen condition until desired for use, according to the usual cold storage practices. When desired for use, the product is then allowed to thaw out.

Another example illustrating the carrying out of my invention is as follows:—

The yolk material is separated from the whites by the usual commercial process and about 270 pounds of the yolk is placed in any suitable mixing equipment. About 21 to 27 pounds of ordinary sodium chloride is added while mixing.

While this mixture is being agitated, about 2 to 4 pounds of finely powdered gum tragacanth, wetted with about 4 to 8 pounds of liquid vegetable oil as previously described, is added gradually and the entire mixture agitated, either manually or by suitable mechanical means.

This product is then drawn off into cans and is now ready for use in many industries. If a further modification of the physical consistency and colloid properties is desired, the product may be placed in cans and subjected to a freezing process by placing it in a refrigerator at approximately freezing temperatures for the specific mixture or lower; and the mixture is frozen to an immobile mass.

When the product is properly frozen, it may be kept in a frozen, immobile condition at temperatures at which ordinary frozen yolks are kept in egg freezing plants until desired for use. When desired for use, they are taken from the refrigerator and allowed to thaw out.

The advantage of dispersing the powdered gum tragacanth or its equivalent in the above salt treated yolk and then freezing the product and thawing when ready for use, consists in that a product is obtained after thawing which has a greater viscosity than similarly thawed out yolk containing the same amount of sodium chloride preliminarily kept in the same frozen condition. Such yolk product, while soft and smooth, has certain new colloidal and emulsifying properties when used to emulsify vegetable oils or animal and vegetable oils and fats with other aqueous materials.

Another example of carrying out my invention is as follows:—An approximately similar quantity of powdered gum tragacanth, namely: from 2 to 4 pounds, is wetted with about 4 to 8 pounds of liquid vegetable oil such as corn oil and introduced by means of agitation to a batch of commercially separated yolks weighing about 270 pounds, to which 27 pounds of a crystalloid carbohydrate such as cane sugar or dextrose has been added. The mixture is then agitated for a few minutes to further disperse the hydrophyllic colloid in the moisture of the egg material. The product is then drawn off and is ready for use. If desired to keep for long periods of time, it is subjected to freezing temperatures for the specific mixture or lower and the product is frozen. When thawed out, it will have a greater viscosity than a yolk treated with similar amounts of sugar frozen and then thawed. In place of sucrose, another water soluble compound containing hydroxyl groups such as glycerine may be used.

The gum tragacanth or its equivalent hydrophyllic colloid suspended in the non-aqueous medium such as cotton seed oil may be added to an egg batch containing a substantial mixture of sodium chloride in combination with water soluble organic compound containing hydroxyl groups capable of lowering the freezing point of water. Thus, for example, about 2½ pounds of gum tragacanth are suspended in about 6 pounds of cotton seed oil and added by means of agitation to 270 pounds of egg yolk which has been previously treated with 15 pounds of salt and 14 pounds of sucrose. If desired, about .75 pounds of tartaric acid dissolved in an equal weight of water is also added to impart to the product other properties. The above product made in any of the described methods may be frozen to an immobile mass and kept frozen until desired for use and then thawed out. If desired, it may be used directly before subjecting to freezing temperatures.

In many industries, where it is advisable to use a yolk product containing a larger proportion of whites than that usually present in whole mixed eggs or in separated yolks, a certain amount of whites may be allowed to adhere to the yolk or may be added and then the mixture of egg substance is treated in the manner described above.

If gum tragacanth is added to egg material containing a sufficient amount of edible electrolyte such as sodium chloride, or a sufficient amount of water soluble organic compounds containing hydroxyl groups such as glycerine or a sufficient amount of crystalloid carbohydrates capable of lowering the freezing point of water or sufficient amounts of mixtures of above compounds either by themselves or in combination with sufficient acid to reduce bacterial action, then such products may be kept above their respective freezing points, but at a temperature below bacterial decomposition for the respective products, if it is desired to use the product a considerable time after manufacture for several months or longer.

The above substances such as sodium chloride, sugar and glycerine, either singly or in combination, should be in sufficient concentration to reduce bacteriological spoilage at the specific temperatures at which they are kept for the desired interval of time between manufacture and use. A desirable suitable amount of acid may be added such as acetic or tartaric or their equivalent to increase the keeping qualities of the product at the respective temperatures.

I may also add the gum suspended in a liquid vegetable oil to yolk material to which no other substance is added and either use it directly or if certain additional properties are desired, I may subject same to the freezing and thawing process as described above.

I may also suspend the gum material in glycerine. As an example of this process, I may take 270 pounds of yolks, mix them together and to this mixture is added a mixture of about 3 pounds of finely powdered gum tragacanth dispersed in about 23 pounds of glycerine. The gum glycerine mixture is added gradually to the yolk material and the whole mass stirred. In the case of glycerine, if a relatively small amount of glycerine is used, the gum glycerine mixture must be added to the egg material before the gum has a chance to absorb the glycerine and set to a jelly-like mass.

This egg mixture with the hydrated gum may then be used immediately or may be frozen as described above and kept in the freezer until ready for use and then thawed out.

Gum tragacanth or equivalent hydrophyllic colloids may also be added to egg material containing varying amounts of sugar such as dextrose, cane sugar or invert sugar, or to egg material containing an acid substance which is capable of giving off hydrogen-ions when brought in contact with egg material, or it may be added to egg material containing a substantial amount of substance or substances of an edible nature containing hydroxyl groups such as glycerine or cane sugar in combination with a substance which will increase the hydrogen-ion concentration, such as lactic acid, tartaric acid or phosphoric acid or their equivalents.

The various egg products in which the gum is dispersed may be used directly after the gum has been hydrated or may be kept at refrigerating temperatures and thawed, if additional or other properties are required.

I do not want to limit my invention to gum tragacanth, but may use a gum like gum acacia or pectin or similar equivalent hydrophyllic colloids. Neither do I limit my invention to the procedure in which the gum is added to the egg material, although by experiment I have found that the methods described are preferable. Nor do I limit my invention to an egg substance containing a definite amount of yolk material. I aim to cover products with varying mixtures of yolks and whites. Neither do I want to limit my invention to the specific quantities of gum as described above. Varying amounts of gum tragacanth or its equivalent may be used, depending upon the viscosity desired and also depending upon whether the product is frozen or not, and whether acid, salt, sugar, glycerine or other substances are added to the egg material. In case of gum acacia, for example, more is used to obtain substantially the same result.

One of the objects of my discovery is that I may be able to use a hydrophyllic colloid such as gum tragacanth and its equivalent to increase the viscosities in egg material by using relative amounts of such colloids. A further advantage consists in that the hydrophyllic colloids are neither sweet in taste like sucrose or glycerine nor are they sour like lactic acid, tartaric acid, etc., nor saline as sodium chloride, and for this reason, the use of the small proportion of hydrophyllic colloid does not impart to the egg material a foreign odor or taste, as is the case with other substances which have been used with the object of modifying viscosities.

I therefore can use the hydrophyllic colloid by itself in the egg batch or in many cases in combination with other modifiers of viscosity such as salt, sugars, acid glycerine, with the object of obtaining increased viscosity without any other effects, from the added colloid.

Whether the egg product is frozen or not, I can add relatively very small proportions of the gum and substantially increase the viscosity without imparting to the egg product either a saline, sweet or acid taste.

I have found that in the case, for instance, of ordinary whole mixed eggs, quantities as low as .1% and as high as .3% of gum tragacanth give good results even if the product is frozen; in the case of yolk products, as high as 1.3% were used by me. However, more or less of the hydrophyllic colloid may be used depending upon the other substances to which the egg is added and the condition under which the egg is stored.

The amount of gum used is also governed by the final use to which the egg material is subjected. I have also found that the viscosity of the egg products is increased materially when treated with the gum and subsequently frozen and kept in a frozen condition for some period of time until ready for use, when it is first thawed.

What I claim as new and desire to secure by United States Letters Patent is:—

1. A method of manufacturing an egg product including treating egg material with an amount of edible hydrophyllic colloidal substance capable of dispersing uniformly in water at room temperature sufficient to modify the colloidal property of the ultimate product.

2. A method of manufacturing an egg product including treating egg material with an amount of gum tragacanth sufficient to modify the colloidal property of the ultimate product.

3. A method of manufacturing an egg product including treating egg yolk with an amount of edible hydrophyllic colloidal substance capable of dispersing uniformly in water at room temperature sufficient to modify the colloidal property of the ultimate product.

4. A method of manufacturing an egg product including treating egg yolk with an amount of gum tragacanth sufficient to modify the colloidal property of the ultimate product.

5. A method of manufacturing a frozen egg product including treating egg material with an amount of edible hydrophyllic colloidal substance capable of dispersing uniformly in water at room temperature sufficient to modify the colloidal property of the ultimate product, and freezing the mixture.

6. A method of manufacturing a frozen egg product including treating egg material with an amount of gum tragacanth sufficient to modify the colloidal property of the ultimate product, and freezing the mixture.

7. A method of manufacturing an egg product including mixing edible vegetable gum capable of dispersing uniformly in water at room temperature with a non-aqueous edible liquid medium and dispersing this mixture in egg material.

8. A method of manufacturing an egg product including mixing gum tragacanth in an edible vegetable oil and dispersing this mixture in egg material.

9. A method of manufacturing an egg product including mixing edible vegetable gum capable of dispersing uniformly in water at room temperature with a non-aqueous liquid medium and dispersing this mixture in egg material otherwise treated to modify the viscosity thereof.

10. A method of manufacturing a frozen egg product including mixing edible vegetable gum capable of dispersing uniformly in water at room temperature with a non-aqueous liquid medium and dispersing this mixture in egg material, and freezing the mixture.

11. A method of manufacturing a frozen egg product including mixing gum tragacanth in an edible vegetable oil and dispersing this mixture in egg material, and freezing the mixture.

12. A method of manufacturing a frozen egg product including mixing edible vegetable gum capable of dispersing uniformly in water at room temperature with a non-aqueous liquid medium and dispersing this mixture in egg material otherwise treated to modify the viscosity thereof when frozen and thawed, and freezing the mixture.

13. A new article of manufacture comprising an egg product including egg material combined with an edible hydrophyllic colloidal substance capable of dispersing uniformly in water at room temperature sufficient in amount to modify the physical property of the ultimate product.

14. A new article of manufacture comprising an egg product including egg material combined with gum tragacanth sufficient in amount to modify the physical property of the ultimate product.

15. A new article of manufacture comprising an egg product including egg material and an edible hydrophyllic colloidal substance capable of dispersing uniformly in water at room temperature dispersed substantially homogeneously in the egg material.

16. A new article of manufacture comprising an egg product including egg material and an edible hydrophyllic colloidal substance capable of dispersing uniformly in water at room temperature dispersed in an edible vegetable oil.

17. A new article of manufacture comprising an egg product including egg material otherwise treated to modify the viscosity thereof combined with an edible hydrophyllic colloidal substance capable of dispersing uniformly in water at room temperature sufficient in amount to modify the physical property of the ultimate product.

18. A new article of manufacture comprising an egg product including egg material otherwise treated to modify the viscosity thereof and an edible hydrophyllic colloidal substance capable of dispersing uniformly in water at room temperature dispersed therein.

19. As a new article of manufacture, a frozen egg product including egg material combined with an edible hydrophyllic colloidal substance capable of dispersing uniformly in water at room temperature sufficient in amount to modify the physical property of the ultimate product when thawed.

20. As a new article of manufacture, a frozen egg product including egg material combined with gum tragacanth sufficient in amount to modify the physical property of the ultimate product when thawed.

21. As a new article of manufacture, a frozen egg product including egg material combined with an edible hydrophyllic colloidal substance capable of dispersing uniformly in water at room temperature mixed with a non-aqueous liquid sufficient in amount to modify the physical property of the ultimate product when thawed.

22. As a new article of manufacture, a frozen egg product including egg material combined with gum tragacanth mixed with a non-aqueous liquid sufficient in amount to modify the physical property of the ultimate product when thawed.

23. As a new article of manufacture, a frozen egg product including egg material otherwise treated to modify the viscosity thereof when frozen and thawed combined with an edible hydrophyllic colloidal substance capable of dispersing uniformly in water at room temperature sufficient in amount to modify the physical property of the ultimate product when thawed.

24. As a new article of manufacture, a frozen egg product including egg material otherwise treated to modify the viscosity thereof when frozen and thawed combined with an edible hydrophyllic colloidal substance capable of dispersing uniformly in water at room temperature mixed with a non-aqueous liquid sufficient in amount to modify the physical property of the ultimate product when thawed.

25. As a new article of manufacture, a mobile egg product preliminarily frozen and thawed and including egg material combined with an edible hydrophyllic colloidal substance capable of dispersing uniformly in water at room temperature sufficient in amount to modify the physical property of the ultimate product when thawed.

26. As a new article of manufacture, a mobile egg product preliminarily frozen and thawed and including egg material combined with an edible hydrophyllic colloidal substance capable of dispersing uniformly in water at room temperature dispersed in a non-aqueous liquid sufficient in amount to modify the physical property of the ultimate product when thawed.

27. A method for manufacturing an egg product including adding to an egg material consisting of substantially yolks, gum tragacanth mixed with a relatively larger proportion of powdered sodium chloride, dispersing this mixture in the egg material to modify the viscosity thereof.

28. A method for manufacturing an egg product including adding to an egg material consisting of substantially yolks, gum tragacanth mixed in an edible non-aqueous liquid, and an amount of sodium chloride sufficient to reduce the bacterial decomposition of the product at temperatures above the freezing point of the mixture, and keeping the product at temperatures below the temperature of bacterial decomposition but above the freezing temperatures of the mixture.

29. A method for manufacturing a frozen egg product including adding to yolk material, hydrophyllic colloid capable of imbibing water at normal temperatures, said hydrophyllic colloid to be first suspended in a suitable non-aqueous medium, then adding said suspension of colloids to egg material consisting essentially of yolk treated with a substantial quantity of sodium chloride sufficient in amount to retard bacterial decomposition of the product at ordinary temperatures and freezing the mixture to an immobile state, and keeping it frozen until it is to be used.

30. A method for manufacturing an egg product consisting of adding to egg yolk an edible, water soluble, organic compound containing hydroxyl groups capable of preventing denaturing of egg products during freezing, in combination with a hydrophyllic colloid capable of imbibing water of the egg material in sufficient quantity to increase the viscosity of the product at ordinary temperatures, freezing the mixture to an immobile mass and keeping it frozen until it is to be used.

31. A method of producing an egg product consisting of adding to yolk material water soluble organic compound containing hydroxyl groups capable of preventing denaturing of egg protein during freezing in combination with an edible substance in sufficient quantities to increase the hydrogen-ion concentration of the mixture and an edible hydrophyllic colloid capable of imbibing the moisture of the egg material at ordinary temperatures and in sufficient quantities to increase the viscosity of the product, and said ingredients to be properly dispersed and in quantities sufficient to produce an ultimate product which will have a greater viscosity than egg material before freezing, and kept at temperatures below bacterial decomposition for the specific mixtures above the freezing point of the mixtures until it is to be used.

In witness whereof, I hereunto subscribe my name this 11th day of October, 1928.

ALBERT K. EPSTEIN.